(12) United States Patent
Zhang et al.

(10) Patent No.: US 7,638,574 B2
(45) Date of Patent: *Dec. 29, 2009

(54) TIRE TREAD CONTAINING CORE-SHELL PARTICLES

(75) Inventors: Ping Zhang, Hudson, OH (US); Lei Zheng, Apex, NC (US); Feng Anne Xie, Santa Clara, CA (US); Eric Sean Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/170,912

(22) Filed: Jun. 30, 2005

(65) Prior Publication Data

US 2007/0004845 A1   Jan. 4, 2007

(51) Int. Cl.
*C08K 3/04* (2006.01)
*C08L 51/04* (2006.01)
*C08L 9/00* (2006.01)
*C08F 36/00* (2006.01)
*C08F 12/02* (2006.01)

(52) U.S. Cl. .................. 524/495; 524/496; 525/71; 525/98; 526/346; 526/335

(58) Field of Classification Search .................. 525/71, 525/98; 524/496, 495; 526/346, 335
See application file for complete search history.

(56) References Cited

U.S. PATENT DOCUMENTS 5,227,425 A   7/1993   Rauline .................. 524/493

(Continued)

FOREIGN PATENT DOCUMENTS

EP   0 265 142 A2   4/1988

(Continued)

OTHER PUBLICATIONS

U.S. Appl. No. 10/999,406, filed Nov. 30, 2004, Castner et al.

(Continued)

*Primary Examiner*—William K Cheung
(74) *Attorney, Agent, or Firm*—Alvin T. Rockhill

(57) ABSTRACT

This invention is based upon the discovered that crosslinked core-shell particles can be used as a filler in low cost emulsion styrene-butadiene rubber (ESBR) with excellent results being attained. In fact, such core-shell particle filled ESBR exhibits performance similar to silica filled solution styrene-butadiene rubber (SSBR) in terms of dynamic response, Payne effect, rebound and tan δ at 0° C. and 100° C. The utilization of such crosslinked core-shell particles in rubber compounds offers the additional advantage of weight reduction since the core-shell particles are significantly less dense than carbon black or silica fillers. The use of the crosslinked core-shell polymers of this invention in rubber formulations in place of silica also offers the advantage of not needing any expensive silane coupling agents to attain required levels of polymer/filler interaction. Accordingly, no silane coupling agent is used in the rubber compounds of this invention which leads to reduced cost. Cost can be further reduced by virtue of the fact that compound mixing conditions can be substantially relaxed as compared to mixing silica containing rubber formulations. The present invention more specifically discloses A rubbery composition which is comprised of (1) an emulsion styrene-butadiene rubber, (2) carbon black, and (3) core-shell particles, wherein the core-shell particles are comprised of (a) a crosslinked elastomeric core comprised of repeat units that are derived from at least one diolefin monomer, and (b) a polymeric shell which is derived from at least one vinyl aromatic monomer.

19 Claims, 2 Drawing Sheets

U.S. PATENT DOCUMENTS

| | | | |
|---|---|---|---|
| 5,395,891 A | 3/1995 | Obrecht et al. | 525/194 |
| 5,654,365 A * | 8/1997 | Havriliak et al. | 525/98 |
| 6,127,488 A | 10/2000 | Obrecht et al. | 525/333.3 |
| 6,133,364 A | 10/2000 | Obrecht et al. | 524/495 |
| 6,207,757 B1 | 3/2001 | Obrecht et al. | 525/194 |
| 6,242,534 B1 | 6/2001 | Obrecht et al. | 525/191 |
| 6,620,866 B1 | 9/2003 | Obrecht et al. | 524/81 |
| 6,653,404 B2 | 11/2003 | Konno et al. | 525/84 |
| 6,747,095 B2 | 6/2004 | Konno et al. | 525/89 |
| 6,777,500 B2 * | 8/2004 | Lean et al. | 525/316 |
| 6,956,084 B2 * | 10/2005 | Wang et al. | 525/313 |
| 2003/0198810 A1 | 10/2003 | Wang et al. | 428/401 |
| 2004/0127603 A1 | 7/2004 | Lean et al. | 523/201 |
| 2004/0151933 A1 * | 8/2004 | Ajbani et al. | 428/515 |
| 2006/0116473 A1 * | 6/2006 | Castner et al. | 525/71 |

FOREIGN PATENT DOCUMENTS

| | | | |
|---|---|---|---|
| EP | 1 661 926 A | 5/2006 | |

OTHER PUBLICATIONS

Astlett Rubber Inc. "SBR 1502 Cold Polymerized Emulsion Styrene Butadiene Rubber SBR)", Internet Article URL: http://www.astlettrubber.com/pdf/sr/sbr1502.pdf.

* cited by examiner

TIRE TREAD CONTAINING CORE-SHELL PARTICLES

BACKGROUND OF THE INVENTION

Fillers are typically included in the rubber compositions utilized in manufacturing tires, hoses, belts, windshield wiper blades, floor mats, and other rubber products. The fillers are chosen to enhance certain physical characteristics of the rubber composition. The addition of fillers tends to improve the physical properties of the polymer matrices to which they are added. For instance, the inclusion of carbon black and silica in tire tread rubber compounds is critical to attain required strength and tread wear characteristics. However, tires that are made with rubber compositions that contain high levels of fillers typically exhibit a higher level of hysteresis which is a disadvantage because it results in the tire having more high rolling resistance which in turn leads to a higher level of fuel consumption. The continuing desire for improved vehicle safety and low fuel consumption translates into a demand for tire rubber compounds that provide high strength, good tread wear characteristics, good traction, and low rolling resistance. For instance, tire treads are expected to have high abrasion resistance in order to provide a long life expectancy, to exhibit good anti-skid properties in both wet and dry conditions, and to have low hysteresis characteristics at elevated temperatures in order to provide low rolling resistance and reduced dynamic heat build-up.

The utilization of silica in tire tread rubber can lead to lower rolling resistance and better traction on ice, snow, and wet road surfaces conditions when compared with carbon black-based tire rubber compositions. However, one important feature of silica based tire tread compounds is that they typically rely on the utilization of solution styrene-butadiene rubber (SSBR) as the major component of the elastomer system. This is because the use of silica fillers in combination with emulsion styrene-butadiene rubber (ESBR) typically results in less desirable compound performance. Another negative aspect of using silica as a filler in rubber compounds is that it typically requires a relatively high level of an expensive silane coupling agents to attain the required level of interaction with the rubber in the composition. Still another drawback associated with using silica as a filler is that it requires better mixing temperature control than is normally needed in mixing rubber compounds. For these reasons the inclusion of silica as a filler in rubber compounds generally increases the cost of the compound appreciably.

U.S. Pat. No. 5,227,425 discloses a sulfur-vulcanizable rubber composition obtained by thermomechanical working of a conjugated diene compound and an aromatic vinyl compound prepared by solution polymerization in a hydrocarbon solvent having a total content of aromatic vinyl compound of between 5% and 50% and a glass transition temperature (Tg) of between 0° C. and −80° C. with 30 to 150 parts by weight per 100 parts by weight of elastomer of a silica having a BET surface area of between 100 and 250 $m^2/g$, a CTAB surface area of between 100 and 250 $m^2/g$, an oil absorption measured in DBP of between 150 and 250 ml/100 g, and an average projected area of the aggregates greater than 8500 $nm^2$ before use and between 7000 and 8400 $nm^2$ after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

U.S. Pat. No. 5,227,425 illustrates the need for using expensive synthetic rubbers made by solution polymerization in rubber compounds that are silica filled. For instance, expensive solution SBR is typically used in conjunction with silica and a silane coupling agent to achieve good tire rolling resistance and wet traction performance. This approach to using silica fillers in solution SBR also requires good control in compound mixing.

U.S. Pat. No. 5,395,891 and U.S. Pat. No. 6,127,488 to Obrecht disclose the use of crosslinked polybutadiene and crosslinked styrene-butadiene copolymers, respectively, as fillers for rubber compounds. The purported benefit of the inclusion of these crosslinked rubber particles in rubber formulations is lower hysteresis. Additionally, polybutadiene gels have been shown to impart improved abrasion resistance while styrene-butadiene copolymer gels have demonstrated improved tire wet traction characteristics. U.S. Pat. No. 6,133,364, U.S. Pat. No. 6,207,757, and U.S. Pat. No. 6,242,534 to Obrecht et al disclose a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of these gels in tire tread compositions are reported to be lower hysteresis, improved abrasion resistance, and improved wet traction. However, using these gel particles as fillers shows some critical drawbacks such as inferior mechanical properties (e.g. 300% moduli, tear and abrasion resistance). U.S. Pat. No. 6,620,866 discloses a rubber mixture containing agglomerated rubber gels. The purpose of using the high-pressure agglomerated gels is to improve the recognized deficiency in the mechanical properties.

U.S. Pat. No. 6,747,095 and U.S. Pat. No. 6,653,404 to Konno et al disclose a rubber composition comprising as essential components a crosslinked polymer particle and a non-crosslinked rubber component. The rubber composition may be used to obtain a vulcanized rubber. The crosslinked polymer particles are intended for use as filler to provide a rubber composition having good processability and handling performance as well as improved tensile strength and wear resistance when vulcanized.

SUMMARY OF THE INVENTION

It has been discovered that crosslinked core-shell particles can be used as a filler in low cost emulsion SBR with excellent results being attained. In fact, such core-shell particle filled emulsion SBR exhibits performance similar to silica filled solution SBR in terms of dynamic response, Payne effect, rebound and tan δ at 0° C. and 100° C. The utilization of such crosslinked core-shell particles in rubber compounds offers the additional advantage of weight reduction since the core-shell particles are significantly less dense than carbon black or silica fillers. The use of the crosslinked core-shell polymers of this invention in rubber formulations in place of silica also offers the advantage of not needing any expensive silane coupling agents to attain required levels of polymer/filler interaction. Accordingly, no silane coupling agent is used in the rubber compounds of this invention which leads to reduced cost. Cost can be further reduced by virtue of the fact that compound mixing conditions can be substantially relaxed as compared to mixing silica containing rubber formulations.

Another feature of this invention is that core-shell particles from the emulsion process could be blended with emulsion SBR latex in the manufacturing process to have a good dispersion of the core-shell particles in the SBR matrix. Still another feature of this invention is a substantially reduced compound viscosity, potentially resulting in improved compound processability in comparison with silica-based compounds.

Silica together with a silane coupling agent in combination with a solution SBR give rise to compounds with low rolling resistance and good wet traction (Pauline 1993). However, when combined with emulsion SBR, the silica/silane system does not offer expected performance, especially the rolling resistance performance (Cochet et al 1996). The use of solution SBR and the silane coupling agent not only adds to the total compound cost, but also complicates the process for compound mixing.

This invention is based upon the finding that crosslinked core-shell particles, together with a certain level of carbon black loading, in combination with low cost emulsion SBR (without silane coupling agents) lead to compounds with a high tan δ value at 100° C. and a very low Payne effect (an indication of low filler-filler interaction in the rubber compound). In addition to this a simple two-pass mixing process can be used to mix the core-shell particles into the rubber formulation. This is in contrast to a three-pass mix process which is typically required in mixing silica-based compounds to attain good results. For these reasons the rubber formulations of this invention can be used advantageously as an alternative to silica filled compounds to enhance tire wet traction and rolling resistance characteristics with the added benefits of tire weight reduction and improved processability.

The present invention more specifically discloses a rubbery composition which is comprised of (1) an emulsion styrene-butadiene rubber, (2) carbon black, and (3) core-shell particles, wherein the core-shell particles are comprised of (a) a crosslinked elastomeric core comprised of repeat units that are derived from at least one diolefin monomer, and (b) a polymeric shell which is derived from at least one vinyl aromatic monomer.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of a rubbery composition which is comprised of (1) an emulsion styrene-butadiene rubber, (2) carbon black, and (3) core-shell particles, wherein the core-shell particles are comprised of (a) a crosslinked elastomeric core comprised of repeat units that are derived from at least one diolefin monomer, and (b) a polymeric shell which is derived from at least one vinyl aromatic monomer.

DETAILED DESCRIPTION OF THE INVENTION

Figure 1:
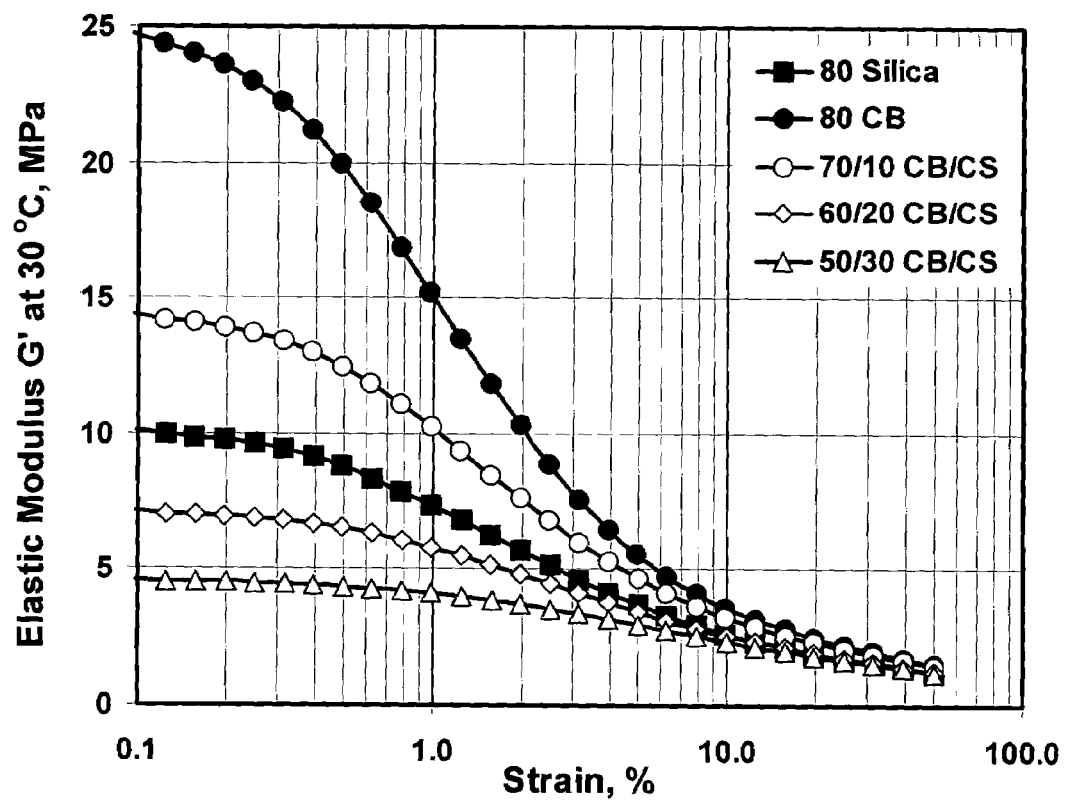
FIG. 1 is a graph of elastic modulus, G' at 30° C., versus strain for several rubber compounds that are filled with carbon black, silica, and various combinations of carbon black and the crosslinked core-shell polymer.

The rubbery compositions of this invention are comprised of (1) an emulsion styrene-butadiene rubber, (2) carbon black, and (3) core-shell particles. The emulsion styrene-butadiene rubber employed in the practice of this invention is made by a conventional emulsion polymerization technique wherein 1,3-butadiene and styrene are copolymerized in an aqueous emulsion by free radical polymerization. The emulsion SBR will typically contain from about 20 weight percent to about 35 weight percent bound styrene and from about 65 weight percent to about 80 weight percent bound butadiene. The emulsion SBR will preferable contain from about 25 weight percent to about 30 weight percent bound styrene and from about 70 weight percent to about 75 weight percent bound butadiene.

The rubbery compositions of this invention will be filled with carbon black and optionally additional fillers, such as silica, starch and/or other fillers. However, the rubbery compositions of this invention will normally be void of silica and other fillers, such as starch. The carbon black will typically be present at a level which is within the range of about 20 to about 100 phr (parts by weight per 100 parts by weight of rubber). It is normally preferred for the carbon black to be incorporated into the rubbery composition at a level which is within the range of 30 phr to 90 phr and it is normally more preferred for the carbon black to be present at a level which is within the range of 40 phr to 80 phr. In cases where additional fillers are used, they will typically be present at levels which are within the range of about 1 phr to about 40 phr and will more typically be present at levels which are within the range of 5 phr to 20 phr.

The carbon black may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 $m^2/g$ |
| N-220 | 111 $m^2/g$ |
| N-330 | 83 $m^2/g$ |
| N-339 | 95 $m^2/g$ |
| N-550 | 42 $m^2/g$ |
| N-660 | 35 $m^2/g$ |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402. Vulcanizing agents can, of curse, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

The core-shell particles that are utilized in the rubbery compositions of this invention are synthesized by an emulsion polymerization technique by polymerizing a conjugated diolefin monomer, such as isoprene or 1,3-butadiene, to a high conversion, alone or in combination with a vinyl aromatic monomer, and a crosslinking monomer, to create an unsaturated, crosslinked polymeric core. Upon obtaining a high conversion of the first monomer charge into the unsaturated, crosslinked polymeric core, a vinyl aromatic monomer, alone or in combination with a diolefin monomer is added to the emulsion and the entire monomer charge is taken to full conversion to create a polymer particles having an exterior which is sufficiently different from the crosslinked elastomeric core to produce a shell-type structure. Preferably the polymeric shell is grafted covalently to the outer surface of the polymeric core. U.S. patent application Ser. No. 10/999,406, filed on Nov. 30, 2004, discloses crosslinked core-shell polymers that are suitable for use in the practice of this invention and a technique for synthesizing such crosslinked core-shell polymers. The teachings of U.S. patent application Ser. No. 10/999,406, filed on Nov. 30, 2004, are incorporated herein by reference in their entirety with respect to the description of the crosslinked core-shell particles and the technique for their synthesis.

A glass transition temperature of −20° C. to 20° C. is preferred for the crosslinked elastomeric core with the shall having a glass transition temperature of 20° C. or above. It is important for the core polymer to have a glass transition temperature within the range of −20° C. to 20° C. to attain high traction characteristics when used in tire tread compounds. The shell will typically be comprised of a polymer having a glass transition temperature that is within the range of 50° C. to 160° C. When the crosslinked elastomeric core and the shell are incompatible with each other, phase separation occurs with the result being a core-shell type structure. The glass transition temperature of the polymer making up the shell will accordingly differ from that of the core by at least 30° C., preferably at least 50° C., and most preferably at least 70° C. It is desirable for this difference in glass transition temperatures to be as great as possible to attain lower rolling resistance when utilized in tire tread compounds.

The weight ratio of the polymer comprising the core to polymer comprising the shell will typically be within the range of 20:1 to 1:1. The weight ratio of the core to the shell will more typically be within the range of 15:1 to 7:1 and will preferably be within the range of 12:1 to 8:1. Accordingly, in synthesizing the core-shell polymer the weight ratio of the monomer charge used in making the core to the monomer charged used in making the shell will typically be within the range of 20:1 to 1:1, will more typically be within the range of 15:1 to 7:1, and will preferably be within the range of 12:1 to 8:1.

The crosslinked elastomeric polymer core and the vinyl aromatic containing shell are synthesized by the emulsion polymerization of vinyl aromatic monomers, and optionally, conjugated diolefin monomers. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene and the like. The conjugated diolefin monomers that can optionally be included in synthesizing the core polymer typically contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in mixture. The choice of monomers and ratio of vinyl aromatic monomers to conjugated diolefin monomer used in making the core polymer will depend upon the properties desired for the polymer particles being made. However, the shell polymer will normally be comprised of at least 75 weight percent vinyl aromatic monomers and will more typically be comprised of at least 80 weight percent vinyl aromatic monomers. It is normally preferred for the shell to be comprised of at least 90 weight percent vinyl aromatic monomers and can be made entirely of vinyl aromatic monomers.

The core particles will typically be crosslinked using a crosslinking monomer unit such as divinyl benzene, diisopropenylbenzene, or 1,2-polybutadiene. The crosslinking monomer will typically be incorporated at a level which is within the range of 0% to about 100%, preferably about 10% to about 30%, by weight based upon the weight of the polymer. Crosslinking the particle can increase the hardness of the core, as well as glass transition temperature of the nanoparticle.

The emulsion polymerization is conducted as a batch, semi-continuous, or continuous operation. Essentially any type of free radical generator can be used to initiate the free radical emulsion polymerization. For example, free radical generating chemical compounds, ultra-violet light or radiation can be used. In order to ensure a satisfactory polymerization rate, uniformity and a controllable polymerization, free radical generating chemical agents which are water-soluble or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

The crosslinked core-shell polymers of this invention can also be synthesized with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisisobutyronitrile (AIBN), are preferred for use in generating free radicals.

The amount of free radical initiator employed will vary with the desired molecular weight of the core particle being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. A chain transfer agent, such as t-dodecyl mercaptan, can optionally be used to reduce the molecular weight of the polymer synthesized during the emulsion polymerization used to make the polymeric core. For instance, the molecular weight of the core polymer reduces with increasing levels of chain transfer agent. However, it is not necessary to utilize a chain transfer agent in the synthesis of the core polymer.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

The soap systems used in the emulsion polymerization process will frequently contain a combination of rosin acid and fatty acid emulsifiers. The weight ratio of fatty acid soaps to rosin acid soaps will typically be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is typically charged into the first polymerization zone. The total amount of soap employed will normally be less than 5 phm. The quantity of soap employed will normally be within the range of about 1 phm to 4 phm. It is typically preferred to utilize a level of soap which is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

After the polymerization has been terminated, the crosslinked core-shell polymer is recovered from the aqueous medium. This can be accomplished by coagulating the latex and recovering the core-shell polymer from the aqueous medium. The coagulation can be accomplished by adding an acid or preferably a combination of salts and an acid to the emulsion. Following the initial coagulation, the core polymer may be washed one or multiple times with water.

The crosslinked core-shell polymer particles are then mixed with emulsion styrene-butadiene rubber and carbon black to make to rubbery compositions of this invention. The crosslinked core-shell polymer, the emulsion styrene-butadiene rubber, and the carbon black can be mixed utilizing conventional equipment, such as Banbury mixers or mill mixers, with conventional techniques. Rubbery polymers in addition to the emulsion SBR can be included in the blend. For instance, the rubbery polymer can also contain solution SBR, cis-1,4-polybutadiene rubber, medium vinyl polybutadiene rubber, high vinyl polybutadiene rubber, natural rubber, synthetic polyisoprene rubber, styrene-isoprene-butadiene rubber (SIBR), 3,4-polyisoprene, and a wide variety of other rubbery polymers. In most cases the rubbery compositions of this invention will be void of solution SBR and the emulsion SBR will represent at least 50 weight percent and preferable 70 weight percent of the total amount of rubbers in the composition.

The rubbery compositions of this invention are of particular value in making tire tread compounds. However, they are also of value for use in manufacturing other products where low hysteresis is desirable, such as power transmission belts. In any case, the rubbery composition of this invention can be blended with a wide variety of additional ingredients to attain the desired combination of physical attributes. For instance, it may be desirable to blend one or more resins, such as, coumarone-indene resin into the composition in cases where treads for high performance tires are being manufactured. The resin will normally be added in an amount that is within the range of about 5 phr to about 60 phr in race tire applications. In passenger tire applications, the resin will typically be added in an amount that is within the range of 0 phr to about 20 phr. In passenger tire applications, it is typically preferred for the tread compound not to contain any resin.

The crosslinked core-shell containing rubbery compositions of this invention can be compounded utilizing conventional ingredients and standard techniques. For instance, the rubber compound will typically also include sulfur, accelerators, waxes, scorch inhibiting agents and processing aids. In most cases, the tread rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The blend will also normally include from 0.1 to 2.5 phr of at least one accelerator with 0.2 to 1.5 phr being preferred.

Antidegradants, such as antioxidants and antiozonants, will generally be included in the blend in amounts ranging from 0.25 to 10 phr with amounts in the range of 1 to 5 phr being preferred. The rubbery compositions of this invention will also normally contain from 0.5 to 10 phr of zinc oxide with 1 to 5 phr being preferred. These blends can optionally contain from 0 to 30 phr of tackifier resins, 0 to 10 phr of reinforcing resins, 1 to 10 phr of fatty acids, 0 to 2.5 phr of peptizers and 0 to 1 phr of scorch inhibiting agents.

The tire tread rubber formulations of this invention can be used in tire treads in conjunction with ordinary tire manufacturing techniques. Tires are built utilizing standard procedures with the tread compound of this invention simply being substituted for the rubber compounds typically used as the tread rubber. After the tire has been built with the tread compound of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Preparation of Polystyrene Reinforced Polyisoprene Particles

A 10 gallon (38 liter) reactor equipped with two axial flow turbines operating at 220 rpm was evacuated for 30 minutes and then charged with a soap solution composed of 41.1 lbs (18.6 kg) of reverse osmosis (RO) water, 25.3 grams or tripotassium phosphate, 6.33 lbs (2.87 kg) of a 10% solution of C14-C18 unsaturated fatty acid potassium salt, 239 grams of a 20% solution of the potassium salt of disproportionated rosin acid, 52.3 grams of a 47.5% active dispersion of sodium naphthalenesulfonate-formaldehyde. The pH of the soap solution was adjusted to 10.5-11.0 with a 20% potassium hydroxide solution.

To the reactor was added an activator solution composed of 440 grams of RO water, 12.9 grams of hydroxymethane-sulfinic acid monosodium salt dihydrate, and 3.79 grams of ethylenediaminetetraacetic acid, ferric sodium complex. Then, 17.64 lbs (8.0 kg) of isoprene and 6.61 lbs (3.0 kg) of 55% divinyl benzene were added to the reactor. The reactor was cooled to a temperature of 10° C. (50° F.). When the contents of the reactor reached 10° C. (50° F.), 30.0 grams of a 55% active pinane hydroperoxide was added. The reaction was allowed to proceed until the solids content reached full conversion (~30% solids). The reactor was then charged with 1100 grams of styrene and 15 grams of pinane hydroperoxide. The reaction was allowed to proceed until 100% monomer conversion was attained at a solids content of about 32% at which point the polymerization was stopped by the addition of 44 grams of 15% active N-Isopropylhydroxylamine. The latex was degassed and steam stripped until the residual isoprene level was reduced to less than 500 parts per million (ppm).

The latex was then stabilized by the addition of about 1%, based upon the total eight of polymers, of a tri(mixed mono & dinonylphenyl)phosphite antioxidant. The latex as then coagulated in a solution containing 120 lbs (54.4 kg) of RO water and 4 lbs (1.8 kg) of sodium chloride which had been adjusted to a pH of 3.5 with sulfuric acid by slowly adding the latex to the water/salt solution. The coagulum was washed twice with RO water and dried at 60° C. (140° F.) in a forced air oven.

EXAMPLE 2

Preferred Preparation of Polystyrene Reinforced Polyisoprene Particles

A 10 gallon (37.85 liter) reactor equipped with two axial flow turbines operating at 220 rpm was evacuated for 30 minutes and then charged with a soap solution composed of 41.6 lbs (18.87 kg) of reverse osmosis (RO) water, 24.8 grams of tripotassium phosphate, 6.21 lbs (2.82 kg) of a 10% solution of C14-18 unsaturated fatty acid potassium salt, 235 grams of a 20% solution of the potassium salt of disproportionated rosin acid, 51.4 grams of a 47.5% active dispersion of sodium naphthalenesulfonate-formaldehyde. The pH of the soap solution was adjusted to 10.5-11.0 with a 20% potassium hydroxide solution.

Then, 17.3 lbs (7.85 kg) of isoprene and 6.49 lbs (2.94 kg) of 55% divinyl benzene were then added to the reactor. The reactor was heated to 65° C. (149° F.). When the contents of the reactor reached 65° C. (149° F.), 17.3 grams of potassium persulfate dissolved in 432 grams of water was added. The reaction was allowed to proceed until the solids content reached full conversion (~30% solid). The reactor was then charged with 1080 grams of styrene and 1.73 grams of potassium persulfate dissolved in 43.2 grams of water. The reaction was allowed to proceed until 100% conversion of the monomer at about 32% solids and stopped by addition of 43.2 grams of 15% active N-isopropylhydroxylamine. The latex was degassed and steam stripped until the residual isoprene level was less than 500 parts per million (ppm).

To the latex was added about 1% of total weight of polymers tri(mixed mono & dinonylphenyl)phosphite antioxidant. The latex was then coagulated in a solution of 120 lbs (54.43 kg) RO water at ~70° C. (~158° F.) and 4 lbs (1.81 kg) sodium chloride with the solution pH adjusted to 3.5 with sulfuric acid by slowly adding the latex to the water/salt solution. The coagulum was washed twice with RO water and dried at 60° C. (140° F.) in a forced air oven.

EXAMPLE 3

In this series of experiments the crosslinked core-shell particles synthesized in Example 2 were substituted for a portion of the carbon black used in a control (Sample ID 2). Carbon black was replaced on a part for part basis with the crosslinked core-shell particles in Sample IDs 3-5 while in Sample IDs 6-8, carbon black was replaced by the crosslinked core-shell polymer particles on an equal volume base. The details with regard to the exact compositions of the rubbery formulations made in this series of experiments are shown in Table I and the physical properties of the compositions are given in Table II.

TABLE I

Compound Formulations

| | Sample ID | | | | | | | |
|---|---|---|---|---|---|---|---|---|
| | 1 | 2 | 3 | 4 | 5 | 6 | 7 | 8 |
| Sample Lab ID | Silica | CB | CB/CS | CB/CS | CB/CS | CB/CS | CB/CS | CB/CS |
| BR (BUD1208) | 30 | 30 | 30 | 30 | 30 | 30 | 30 | 30 |
| SSBR (SLF25X52) | 96.25 | | | | | | | |
| ESBR (SBR1721) | | 96.25 | 96.25 | 96.25 | 96.25 | 96.25 | 96.25 | 96.25 |
| Silica (Z1165MP) | 80 | | | | | | | |
| Carbon Black (N234) | | 80 | 70 | 60 | 50 | 70 | 60 | 50 |
| PI/PS Core-Shell | | | 10 | 20 | 30 | 7 | 15 | 23 |
| Coupling Agent (S266X) | 12.8 | | | | | | | |
| Oil (Sundex 8125) | 6.25 | 6.25 | 6.25 | 6.25 | 6.25 | 6.25 | 6.25 | 6.25 |
| Zinc Oxide | 2.5 | 2.5 | 2.5 | 2.5 | 2.5 | 2.5 | 2.5 | 2.5 |
| Stearic Acid | 2 | 2 | 2 | 2 | 2 | 2 | 2 | 2 |
| 6PPD | 2 | 2 | 2 | 2 | 2 | 2 | 2 | 2 |
| Wingstay 100 | 1 | 1 | 1 | 1 | 1 | 1 | 1 | 1 |
| Wax | 1.5 | 1.5 | 1.5 | 1.5 | 1.5 | 1.5 | 1.5 | 1.5 |
| CBS | 1.8 | 1.1 | 1.1 | 1.1 | 1.1 | 1.1 | 1.1 | 1.1 |
| Sulfur | 1.6 | 1.4 | 1.4 | 1.4 | 1.4 | 1.4 | 1.4 | 1.4 |
| DPG | 2 | 0.3 | 0.3 | 0.3 | 0.3 | 0.3 | 0.3 | 0.3 |
| Total, phr | 240 | 224 | 224 | 224 | 224 | 221 | 219 | 217 |

TABLE II

Compound Properties

| | 1 Silica | 2 CB | 3 CB/CS | 4 CB/CS | 5 CB/CS | 6 CB/CS | 7 CB/CS | 8 CB/CS |
|---|---|---|---|---|---|---|---|---|
| Properties | | | | | | | | |
| SSBR | X | | | | | | | |
| ESBR | | X | X | X | X | X | X | X |
| Silica Loading, phr | 80 | | | | | | | |
| CB Loading, phr | | 80 | 70 | 60 | 50 | 70 | 60 | 50 |
| CS Loading, phr | | | 10 | 20 | 30 | 8 | 15 | 23 |
| Cure Characteristics | | | | | | | | |
| ts2, min | 2.59 | 2.71 | 2.81 | 3.41 | 3.86 | 2.98 | 3.32 | 3.58 |
| t'50, min | 3.64 | 4.06 | 4.16 | 4.74 | 5.22 | 4.31 | 4.68 | 4.85 |
| t'90, min | 5.53 | 7.51 | 7.70 | 8.53 | 9.21 | 7.80 | 8.35 | 8.55 |
| Max Torque (MH), dNm | 15.96 | 15.24 | 14.14 | 12.19 | 11.41 | 13.41 | 12.49 | 11.63 |
| Min Torque (ML), dNm | 2.98 | 3.77 | 2.90 | 2.33 | 2.09 | 2.70 | 2.29 | 2.08 |
| Processing | | | | | | | | |
| Mooney ML(1 + 4) at 100° C. | 81 | 83 | 72 | 59 | 56 | 69 | 61 | 57 |
| G' @100° C./15%, MPa | 0.220 | 0.226 | 0.193 | 0.154 | 0.144 | 0.184 | 0.159 | 0.147 |
| Shore A Hardness | | | | | | | | |
| 25° C. | 69 | 75 | 71 | 66 | 63 | 71 | 66 | 62 |
| 100° C. | 60 | 59 | 55 | 50 | 47 | 54 | 51 | 48 |
| Rebound, % | | | | | | | | |
| 25° C. | 23 | 24 | 23 | 22 | 22 | 23 | 23 | 23 |
| 100° C. | 54 | 41 | 43 | 47 | 50 | 43 | 45 | 49 |
| RPA Strain Sweep at 100° C. | | | | | | | | |
| G' 1%, MPa | 3.96 | 4.12 | 2.89 | 1.80 | 1.33 | 2.68 | 1.93 | 1.44 |
| G' 40%, MPa | 0.91 | 0.86 | 0.81 | 0.67 | 0.64 | 0.77 | 0.71 | 0.66 |
| G' 1%-G' 40%, MPa | 3.056 | 3.252 | 2.086 | 1.127 | 0.691 | 1.908 | 1.224 | 0.774 |
| G' 40%/G' 1% | 0.229 | 0.210 | 0.279 | 0.374 | 0.480 | 0.288 | 0.366 | 0.461 |
| tanδ at 10% | 0.185 | 0.299 | 0.250 | 0.206 | 0.173 | 0.250 | 0.209 | 0.175 |
| RDS Strain Sweep at 30° C. | | | | | | | | |
| G' 0.1%, MPa | 9.31 | 24.74 | 14.41 | 7.14 | 4.64 | 15.02 | 9.03 | 5.19 |
| G' 50%, MPa | 1.20 | 1.53 | 1.44 | 1.22 | 1.20 | 1.41 | 1.26 | 1.17 |
| G' 0.1%-G' 50%, MPa | 8.11 | 23.21 | 12.97 | 5.92 | 3.44 | 13.61 | 7.77 | 4.02 |
| tanδ max | 0.341 | 0.447 | 0.409 | 0.370 | 0.342 | 0.411 | 0.378 | 0.344 |

TABLE II-continued

| | 1 Silica | 2 CB | 3 CB/CS | 4 CB/CS | 5 CB/CS | 6 CB/CS | 7 CB/CS | 8 CB/CS |
|---|---|---|---|---|---|---|---|---|
| Compound Properties | | | | | | | | |
| DIN Abrasion | | | | | | | | |
| Rel. Volume Loss, mm$^3$ | 113 | 112 | 116 | 122 | 130 | 109 | 111 | 125 |
| Specific Gravity | | | | | | | | |
| Compound | 1.206 | 1.183 | 1.148 | 1.117 | 1.097 | 1.151 | 1.125 | 1.099 |

It can be seen that replacing carbon black with core-shell particles gives rise to reduced Mooney viscosity and uncured G' at 100° C., to levels much lower than those of silica reference compound, an indication of improved processability.

The high temperature rebound and tan δ at high temperatures of carbon black-containing compounds are also reduced with the values of Sample IDs 4, 5, 7, and 8 approach those of the silica reference control compound (Sample ID 1).

The abrasion resistance (DIN abrasion) is not significantly affected with the core-shell substitution for carbon black. However, the compound specific gravity is significantly reduced for core-shell containing compounds in comparison with silica-based compounds. This results in significantly reduced tire weight which is a advantage in and of itself.

The Payne effect, defined as the difference in moduli between small and high strains, shown in FIG. 1, is dramatically reduced and is an indication of lower filler-filler interaction.

Figure 2:
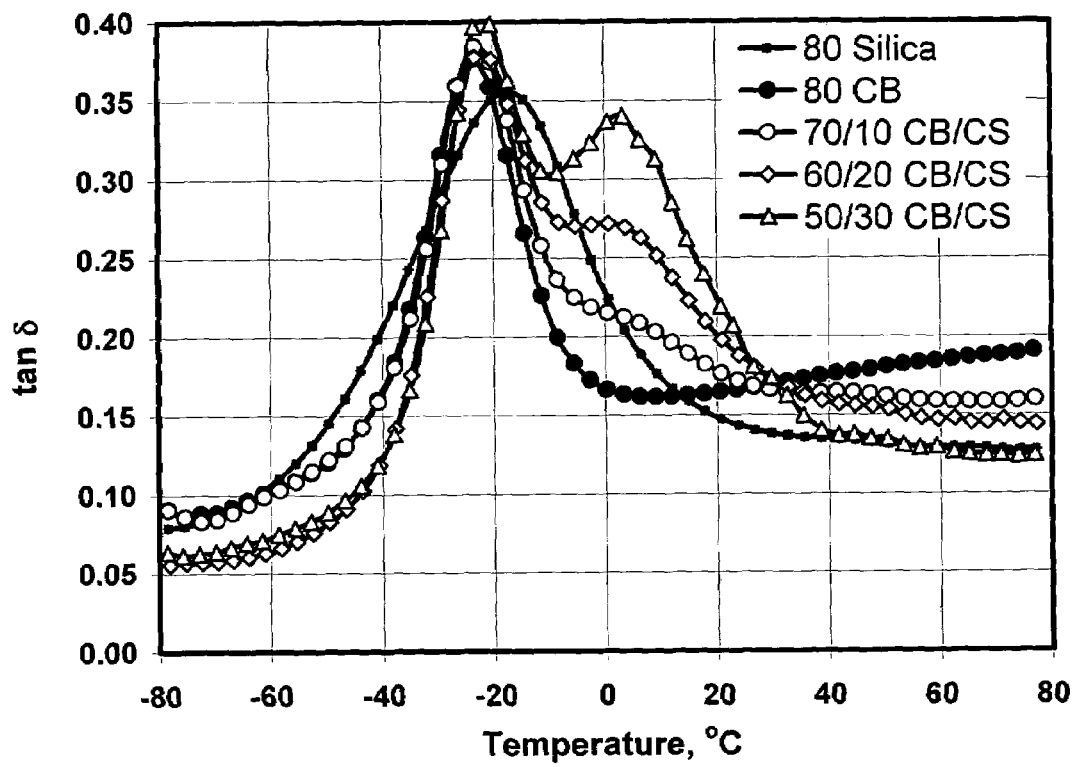
FIG. 2 is a graph of tan δ versus temperature for several rubber compounds that are filled with carbon black, silica, and various combinations of carbon black and the crosslinked core-shell polymer.

In terms of dynamic response at low and high temperatures, partial carbon black replacement results in a desirable combination high tan δ at 0° C. and low tan δ at 100° C. as in the case of silica-based compounds as shown in FIG. 2. A high tan δ value at 0° C. is indicative of good wet traction characteristics and is accordingly very desirable. A high tan δ value at 100° C. is indicative of low rolling resistance and good tire tread wear characteristics.

While certain representative embodiments and details have been shown for the purpose of illustrating the subject invention, it will be apparent to those skilled in this art that various changes and modifications can be made therein without departing from the scope of the subject invention.

What is claimed is:

1. A rubbery composition which is comprised of (1) an emulsion styrene-butadiene rubber, (2) carbon black, (3) core-shell particles, and (4) optionally, one or more additional rubbery polymers, wherein the core-shell particles are comprised of (a) a crosslinked elastomeric core consisting essentially of repeat units that are derived from at least one diolefin monomer and at least one crosslinking monomer selected from the group consisting of divinyl benzene, diisopropenylbenzene, and 1,2-polybutadiene, wherein the crosslinked elastomeric core has a glass transition temperature which is within the range of −20° C. to 20° C., and (b) a polymeric shell which is comprised of at least 75 weight percent repeat units that are derived from a vinyl aromatic monomer, wherein the polymeric shell has a glass transition temperature which is within the range of 50° C. to 160° C., wherein the emulsion styrene-butadiene rubber represents at least 50 weight percent of the total weight of the emulsion styrene-butadiene rubber and additional rubbery polymers in the rubbery composition, wherein the core-shell particles are present at a level which is within the range of 5 to 40 parts by weight based on the total weight of the emulsion styrene-butadiene rubber and additional rubbery polymers in the rubbery composition, and wherein the weight ratio of the core to the shell is within the range of 15:1 to 8:1.

2. A rubbery composition as specified in claim 1 wherein the weight ratio of the core to the shell is within the range of 12:1 to 8:1.

3. A rubbery composition as specified in claim 1 wherein the carbon black is present at a level which is within the range of 20 to 100 parts by weight based on the total weight of the emulsion styrene-butadiene rubber and additional rubbery polymers in the rubbery composition.

4. A rubbery composition as specified in claim 3 wherein the core-shell particles are present at a level which is within the range of 15 to 35 parts by weight based on the total weight of the emulsion styrene-butadiene rubber and additional rubbery polymers in the rubbery composition.

5. A rubbery composition as specified in claim 3 wherein the core-shell particles are present at a level which is within the range of 20 to 30 parts by weight based on the total weight of the emulsion styrene-butadiene rubber and additional rubbery polymers in the rubbery composition.

6. A rubbery composition as specified in claim 1 wherein said composition is void of solution styrene-butadiene rubber.

7. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of the rubbery composition specified in claim 1.

8. A tire as specified in claim 7 wherein the glass transition temperature of the elastomeric core differs from the glass transition temperature of the polymeric shell by at least 30° C.

9. A rubbery composition as specified in claim 1 wherein the emulsion styrene-butadiene rubber represents at least 70 weight percent of the total weight of emulsion styrene-butadiene rubber and additional rubbery polymers.

10. A tire as specified in claim 7 wherein the emulsion styrene-butadiene rubber represents at least 70 weight percent of the total weight of emulsion styrene-butadiene rubber and additional rubbery polymers.

11. A rubbery composition as specified in claim 1 wherein said rubbery composition consists of (1) the emulsion styrene-butadiene rubber, (2) the carbon black, (3) the core-shell particles, (4) optionally, one or more additional rubbery polymers, and (5) one or more members selected from the group consisting of sulfur, accelerators, waxes, scorch inhibiting agents, processing aids, processing oils, antidegradants, zinc oxide, tackifier resins, reinforcing resins, fatty acids, and peptizers.

12. A rubber composition as specified in claim 11 wherein the emulsion styrene-butadiene rubber represents at least 70 weight percent of the total weight of emulsion styrene-butadiene rubber and additional rubbery polymers.

13. A rubbery composition as specified in claim 1 wherein the glass transition temperature of the elastomeric core differs from the glass transition temperature of the polymeric shell by at least 30° C.

14. A rubbery composition as specified in claim 1 wherein the glass transition temperature of the elastomeric core differs from the glass transition temperature of the polymeric shell by at least 50° C.

15. A rubbery composition as specified in claim 1 wherein the glass transition temperature of the elastomeric core differs from the glass transition temperature of the polymeric shell by at least 70° C.

16. A rubbery composition as specified in claim 1 wherein the shell is comprised of at least 85 weight percent repeat units that are derived from a vinyl aromatic monomer.

17. A rubbery composition as specified in claim 1 wherein the shell is comprised of at least 90 weight percent repeat units that are derived from a vinyl aromatic monomer.

18. A rubbery composition as specified in claim 1 wherein the crosslinking monomer is divinylbenzene.

19. A rubbery composition as specified in claim 18 wherein the crosslinking monomer is incorporated into the crosslinked elastomeric core at a level of up to 30%, by weight based upon the weight of the polymer.

* * * * *